United States Patent [19]

Story

[11] Patent Number: 5,673,430
[45] Date of Patent: Sep. 30, 1997

[54] SYSTEM AND METHOD FOR OPTIMIZING SUBSCRIBER PROGRAMMING PREFERENCES

[75] Inventor: Guy A. Story, New York, N.Y.

[73] Assignee: AT&T, Middletown, N.J.

[21] Appl. No.: 542,482

[22] Filed: Oct. 13, 1995

[51] Int. Cl.⁶ .................................................. H04N 7/173
[52] U.S. Cl. ................................... 455/4.2; 342/7; 342/13
[58] Field of Search ......................... 455/4.2, 5.1; 348/2, 348/3, 7, 12, 13, 6, 908; H04N 7/193, 7/16

[56] References Cited

U.S. PATENT DOCUMENTS

| | | | |
|---|---|---|---|
| 4,995,078 | 2/1991 | Monslow et al. | 348/7 |
| 5,291,554 | 3/1994 | Morales | 380/5 |
| 5,351,075 | 9/1994 | Herz et al. | 348/1 |
| 5,446,489 | 8/1995 | Egendorf | 348/3 |
| 5,453,779 | 9/1995 | Dan et al. | 348/13 |
| 5,508,732 | 4/1996 | Bottomley et al. | 348/12 |
| 5,512,934 | 4/1996 | Kochanski | 348/13 |

OTHER PUBLICATIONS

S.L. Hardt–Kornacki, Optimization Model For The Delivery of Interactive Multimedia Documents, GlobeCom, pp. 669–673 1991.

Tak–Shing Peter Yum, Dynamic Channel Assignment in Integrated–Services Cable Networks, IEEE Transactions on Communications, vol. 42, No. 2/3/4 1994.

Primary Examiner—John K. Peng
Assistant Examiner—Nathan J. Flynn
Attorney, Agent, or Firm—Samuel H. Dworetsky

[57] ABSTRACT

A method and system is provided for receiving sets of program requests from a plurality of subscriber locations and delivering programs that match or closely match the selected programming preferences or content requests. A processor at a cable headend registers the selected programming preferences for a given programming period and applies optimization techniques in an effort to have the communications equipment multicast each preference, rather than pointcast, in order to reduce the operating costs of the service provider.

14 Claims, 6 Drawing Sheets

SYSTEM AND METHOD FOR OPTIMIZING SUBSCRIBER PROGRAMMING PREFERENCES

FIELD OF THE INVENTION

The present invention relates to a method for optimizing passive entertainment programming to multiple subscriber locations, where each subscriber location has preregistered preferences for the types and timing of programming to be provided.

BACKGROUND OF THE INVENTION

Service providers of entertainment programming to multiple subscriber locations have for a long time envisioned implementing a system to provide to each subscriber location preregistered programming preferences. Such a system is commonly known as an "interactive system" which is typically implemented in cable based formats. The first commercial realization of interactive cable were the QUBE systems of the Warner Amex Cable Company. In the QUBE interactive system, the subscriber was provided with a small console having a plurality of switches. By pressing a certain combination of switches the subscriber created and sent a short message to the cable headend, in response to a request sent downstream from the headend. The QUBE systems were mainly used for ordering a single pay-per-view offering and for audience polls.

Even for a limited interaction between the service provider and the subscriber as in the QUBE systems, there exists considerable technical difficulty in implementing the necessary upstream (and downstream) data communications. The service provider must install bidirectional amplifiers and bridges, appropriate computer control facilities at the headend, and subscriber electronics designed to communicate with the computer and accept instructions from the subscriber-operated console.

To expand the service to include many more programming offerings, hundreds of thousands, even millions of video channels are required to meet the programming-on-demand needs of the population of a large city. In 1984 Warner Communications realized this technical and impractical necessity and abandoned an effort to develop a video-on-demand system for providing scores of movies and other content requests on individual subscriber demand.

Subsequently, service providers, in an effort to approach true video-on-demand, began to broadcast a few hundred popular films, supplemented by a few video-on-demand channels for less frequently viewed films. However, this approach usually makes only one movie or program available to all the subscriber locations, usually through a pay-per-view service. With this scheme each subscriber can still not be provided with a series of programming preferences, e.g., the feature movie, followed by a preferred sitcom, followed by the news/weather report, followed by another preferred sitcom, etc., due to the limited amount of video channels and video-playing machines at the cable headend.

Therefore, there exists a need to provide an interactive cable system capable of registering multiple subscriber programming preferences and delivering these preferences.

SUMMARY OF THE INVENTION

The present invention is a method and system for providing a set of programs to a plurality of subscriber locations where each subscriber location has selected or registered different programming requests for a given time period. The disclosed method and system applies optimization techniques to identify a set of satisfying programs and delivers, preferably through multicasting, to each subscriber location a set of programs satisfying the desired programming requests. These preferences or requests may include the types, sequences, and start- or end-time constraints of a series of discrete expressive works.

As used in the present invention, optimization entails the efforts and processes of making a decision, a design, or the interactive cable system as perfect or effective as possible by satisfying each subscriber and reducing the cost to the service provider by multicasting the selected preferences to two or more subscriber locations, rather than pointcasting individual programming preferences. For instance, the service provider may have to pay for transport bandwidth from the access provider, it may have to pay for server bandwidth, and/or content royalties to the content provider. Therefore, the cost to the service provider of supplying programming is reduced when multiple subscribers can share the same programming.

Further features of the invention, its nature and various advantages will be more apparent from the accompanying drawings and the following detailed description of the invention.

DETAILED DESCRIPTION OF THE PREFERRED EMBODIMENT

Figure 1:
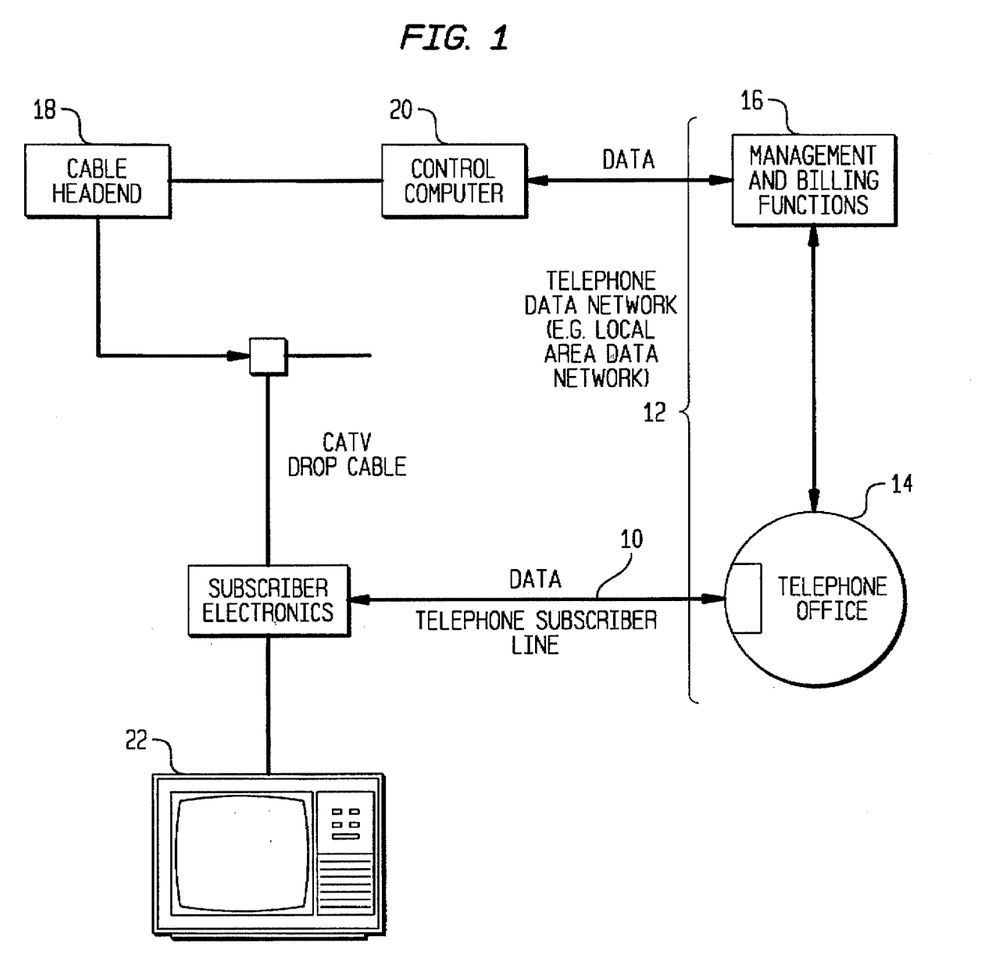
FIG. 1 is a block diagram of an interactive cable system having telephone network facilities and a cable headend where individual subscriber preferences are optimized and transmitted in accordance with the present invention.

Referring now to the drawings, in which like reference numerals identify similar or identical elements, FIG. 1 illustrates a block diagram of a communications network, adapted to provide a method by which passive entertainment programming is provided to multiple subscribers where each subscriber has registered various preferences for the types and timing of programming to be provided. Preferably, and as will be discussed further below, each subscriber indicates to the service provider his or her preferences for programming. It is noted that the method of providing a subscriber's preregistered preferences is described in commonly assigned patent application "User Programmable Entertainment Method and Apparatus" having Ser. No. 08/267,681 and a filing date of Jun. 28, 1994, (UPE patent application), now U.S. Pat. No. 5,541,638, the contents of which are incorporated herein by reference.

It is to be appreciated that the present invention method of providing passive entertainment programming which is described hereinbelow is implemented in the system service provider. Specifically, the service provider applies well known optimization techniques to simultaneously maximize total subscriber satisfaction while minimizing the cost of delivery. However, the aforesaid method of providing passive entertainment programming is not to be understood to be limited to the system service provider as it may be adapted to be implemented in any suitable system component, as the implementation of the present invention method in the service provider is for illustrative and exemplary purposes only.

With reference to FIG. 1, the method and system of the present invention allows each subscriber to request for specific preferences to be "in effect" for a particular time period during periods when the service is offered, for example, during prime-time via a telephone subscriber line 10. The telephone data network 12, having a telephone office 14 and a management and billing functions station 16 routes the preferences to the cable headend 18 via a control computer 20. During this time period a series of programming choices are delivered from the cable headend 16 to each subscriber's television 22 that match or closely match that particular subscriber's designated preferences. In particular, the disclosed method allows the service provider to reduce costs by optimizing all the designated preferences and having multiple subscriber locations share the same programming, i.e., multicasting, rather than pointcasting, the programming preferences.

As referred to herein, optimization entails the efforts and processes of the service provider in deciding on sets of programs to broadcast for making the interactive cable system as perfect or effective as possible. Optimization as applied by the service provider encompasses the procedures used to decide on the one specific solution in a defined set of possible programming alternatives that will best satisfy selected criteria, such as maximize subscriber satisfaction and minimize the operating cost to the service provider.

Figure 2:
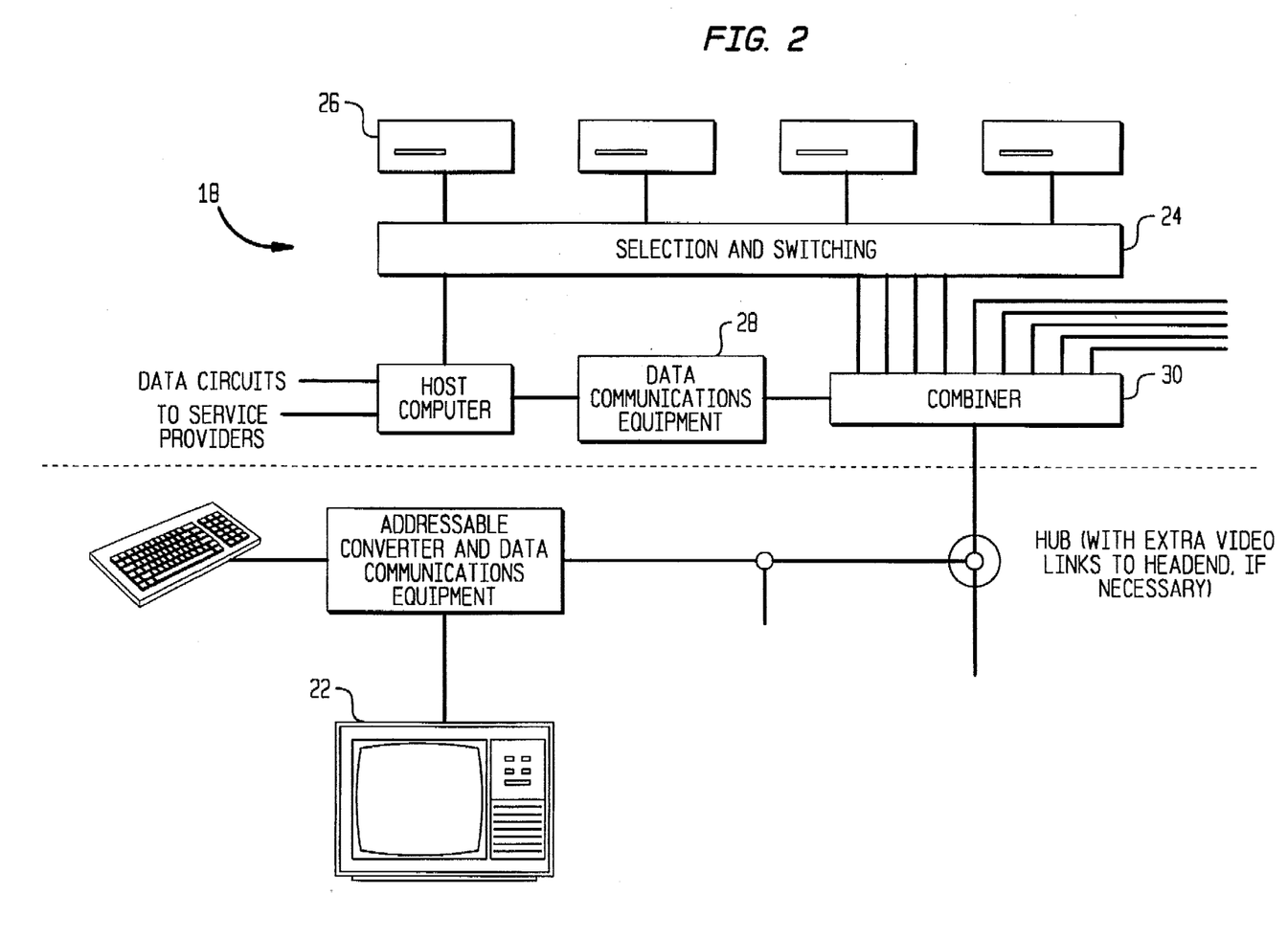
FIG. 2 is a block diagram illustrating the components and equipment of the cable headend of FIG. 1.

For example, assume there are two subscribers, and one wants an hour of drama followed by a half-hour sitcom, and the other wants an hour of drama followed by an hour of local news and weather. The service provider, in accordance with the present invention, would multicast the drama to both aforesaid subscribers, then pointcast the sitcom and news/weather to the first and second subscribers, respectively. With reference to FIG. 2, at the cable headend 18, the service provider using selection and switching equipment 24 multiplexes programing signals from a series of video-playing machines 26 and multicasts the selected programming preferences using data communications equipment 28 to the corresponding subscriber locations via a combiner 30.

The present method for providing video-on-demand requires the service provider to optimize the selected preferences to multicast, rather than pointcast the selected programming preferences, in order to minimize operating costs. Further, the service provider may preferably be operational to create a programming schedule prior to the actual program time of day and during "offline times". For example, in the late afternoon of each day, the service provider may analyze all current subscriber preferences and create the pointcast, multicast or broadcast schedule for that entire evening.

The formulation and solution of an optimization problem involves the establishment of evaluation criteria based on the objectives of the optimization problem, followed by determination of the optimum values of the controllable or independent parameters that will best satisfy the evaluation criteria. The latter is accomplished either objectively or by analytical manipulation of the so-called criterion function, which relates the effects of the independent parameters on the dependent evaluation criterion parameters. In most optimization problems, there are a number of conflicting evaluation criteria and a compromise must be reached by a trade-off process which makes relative value judgments among the conflicting criteria.

Described below is a preferred method of how the optimization problem is formulated in the context of the present invention where a cable headend provides programming to a plurality of subscriber locations. As stated above, and in accordance with the present invention, the preferred design would multicast, rather than pointcast, the selected programming preferences.

Figure 3A:
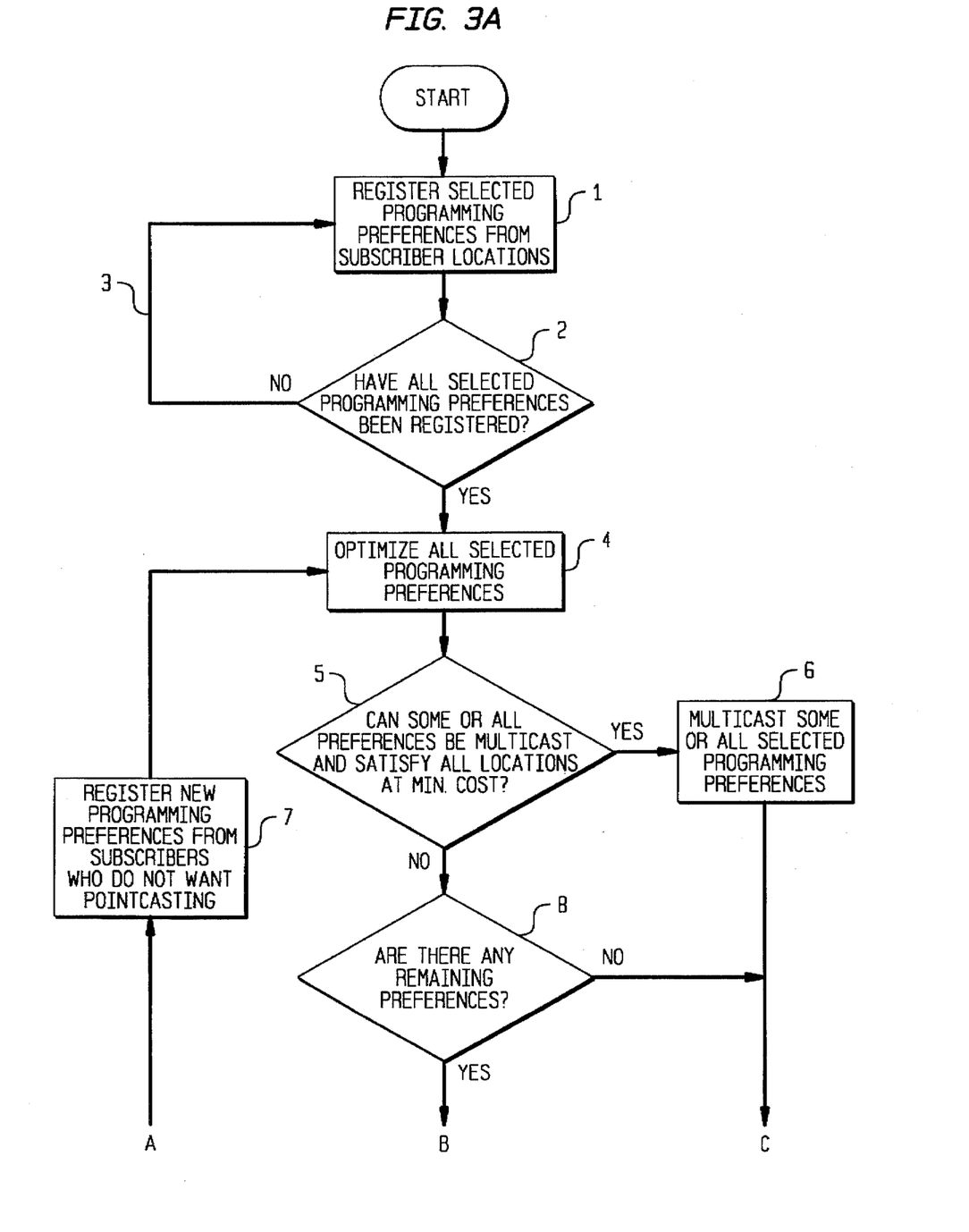
FIGS. 3A and 3B portray a flow chart illustrating the method of operation of the block diagram of FIG. 1.

For example, with reference to FIG. 3A and particularly to the box marked with the number one, there are n subscriber locations $S_1, \ldots, S_n$, where each subscriber location $S_i$ expresses its preferences $P_i$ via use of an appropriate interface, such as that described in the UPE patent application. These preferences may include the types, sequencing, and start- or end-time constraints of a series of discrete expressive works. A specific discrete expressive work may be named as well, such as a particular episode of a sitcom. FIG. 3 is described in more detail below after a discussion on the formulation of the optimization problem in the context of the disclosed method and system.

One aspect of formulating a formal optimization problem is the establishment of a satisfactory criterion function that describes the behavior of the evaluation criterion as a function of the independent parameters. In symbolic form, the criterion function can be expressed as follows: criterion parameter=function of independent parameters $x_1, x_2, \ldots, x_n$. This is represented by the following equation:

$$K=f(x_1, x_2, \ldots, x_n).$$

As stated above, the main task of the service provider is to maximize subscriber satisfaction while minimizing its cost of delivery. Therefore, in this case, there are two dependent evaluation criterion parameters, i.e., subscriber satisfaction and service provider cost. These criteria depend on a set of independent parameters. For the subscriber satisfaction criterion, the independent parameters it depends on are the subscriber preferences and the delivered programming (these parameters can be controlled by the service provider or the subscriber). The values of these independent parameters determine the resulting value of subscriber satisfaction, the first criterion parameter. The total downstream bandwidth, server resources and total discrete expressive work royalty charges are the independent parameters whose values determine the resulting value of service provider cost, the second criterion parameter.

The relative importance of the two conflicting criteria in regard to the service provider's objectives must be judged by the service provider (the optimizer) in order to arrive at an optimum programming to be delivered. The actual programming delivered to subscriber $S_i$ is $A_i$.

After a value judgment by the service provider with respect to the relative importance of the two criteria has been made, two criterion functions can be established. First, the degree to which $S_i$ is satisfied with the delivered programming is as follows:

$$\text{Satisfaction}(S_i)=f(P_i, A_i) \text{ (first criterion function)}$$

The function $f(P_i, A_i)$ is a sum of terms that measure the "closeness" of the delivered discrete expressive works to the subscriber's preferred discrete expressive works (e.g., a "nature" program might have been delivered in lieu of a selected preference for a "documentary"), as well as terms that indicate the "nearness" to the subscriber's preferred schedule of the actual program sequencing.

Figure 5:
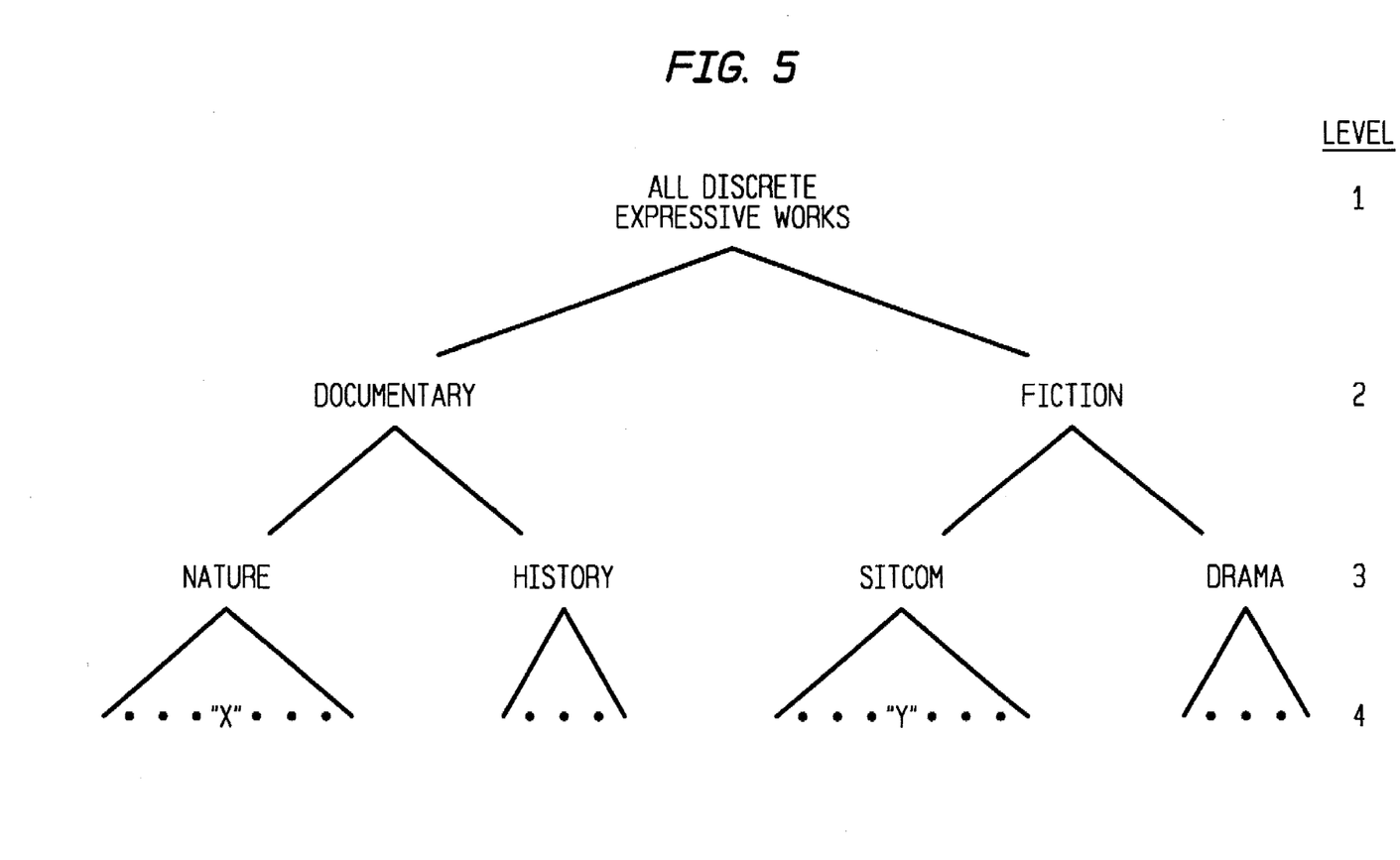
FIG. 5 illustrates a chart showing a systematic numbering system for relating the "closeness" of the delivered discrete expressive works to the subscriber's preferred discrete expressive works.

One method of determining subscriber satisfaction could be based on a categorization of the discrete expressive works in a taxonomy, such as the one shown by FIG. 5. FIG. 5 illustrates a chart showing a systematic numbering system for relating the "closeness" of the delivered discrete expressive works to the subscriber's preferred discrete expressive works. With reference to FIG. 5, if the exact programming preference is delivered, subscriber satisfaction could equal some maximum (e.g. 3). If a "somewhat exact," "close," or "not exact" program is delivered, the subscriber satisfaction would equal the maximum minus the distance in level from the subscriber's preference to the first ancestor of the actual programming in the taxonomy. For example, if the subscriber prefers "X", and "Y" is delivered, Satisfaction=3−(4−1)=0. If the subscriber prefers "Documentary," and "Y" is delivered, Satisfaction =3−(2−1)=2 (see FIG. 5).

The service provider's task is to continuously maintain a high subscriber satisfaction value. If the service provider is forced to deliver a "not exact" program, it may consider pointcasting the actual programming preference and increase its fee to the subscriber to recoup the high bandwidth charges. Therefore, besides the constraint of maximizing subscriber satisfaction while minimizing service provider cost, the service provider has the additional constraint that for $1 \leq i \leq n$, Satisfaction$\geq M$, where M is some minimum level of satisfaction below which there is a danger that a subscriber will cancel the service. Using the systematic numbering system discussed above, M is equal to 0.

Second, the cost to the service provider of delivering programming to all active subscriber locations during some time period is as follows:

Service Provider Cost ≡ $f(BW, SR, R, ...)$
(second criterion function)
where $BW$ is the total
downstream bandwidth
cost, $SR$ is server
resources (cycles,
storage, etc.), and $R$ is
total royalty charges for the
discrete expressive works Table 1 illustrates a chart showing the service provider cost of a simple example for delivering the selected programs of four subscriber locations. In use the values of BW, SR and R may be different for each preferred program or discrete expressive work.

TABLE 1

| Subscriber Location | Preferred Programs | BW | SR | R | Cost = BW + SR + R |
|---|---|---|---|---|---|
| $S_1$ | A, B, C, D | $0.05 | $0.10 | $0.05 | $0.20 |
| $S_2$ | A, B, C, E | $0.05 | $0.10 | $0.05 | $0.20 |
| $S_3$ | A, B, C, D | $0.05 | $0.10 | $0.05 | $0.20 |
| $S_4$ | A, B, E, F | $0.10 | $0.10 | $0.10 | $0.30 |

After optimizing the selected preferences of subscriber locations $S_1$, $S_2$, $S_3$, and $S_4$, programs A and B would be multicast to all the subscriber locations; program C would be multicast to subscriber locations $S_1$, $S_2$, and $S_3$; program D would be multicast to subscriber locations $S_1$ and $S_3$; program E would be multicast to subscriber locations $S_2$ and $S_4$; and program F would be pointcast to subscriber location $S_4$. It is noted that the optimization method of the present invention would pointcast program F to subscriber location $S_4$ after program B, even though subscriber location $S_4$ indicated it prefers program F last. This is done to achieve multicasting of program E to subscriber locations $S_2$ and $S_4$, to foster cost savings to the service provider. However, if subscriber locations $S_2$ and $S_4$ desire to receive their content requests in the designated order, i.e., subscriber locations $S_2$ and $S_4$ have selected specific time constraints, the service provider could pointcast program E to subscriber location $S_2$ and pointcast programs E and F to $S_1$ and $S_4$ and charge a higher fee.

The regional constraint for service provider cost may be defined as $0 \leq BW+SR+R \leq \$1.00$. If the cost exceeds $1.00, the service provider may opt to forgo delivery or arbitrarily deliver any program being multicasted to keep the cost within the regional constraint. However, if the subscriber indicates a willingness to pay a higher fee and the service provider has adequate video-playing and data communication equipment, the service provider can deliver the selected program at a cost which exceeds the maximum cost constraint.

Figure 3B:
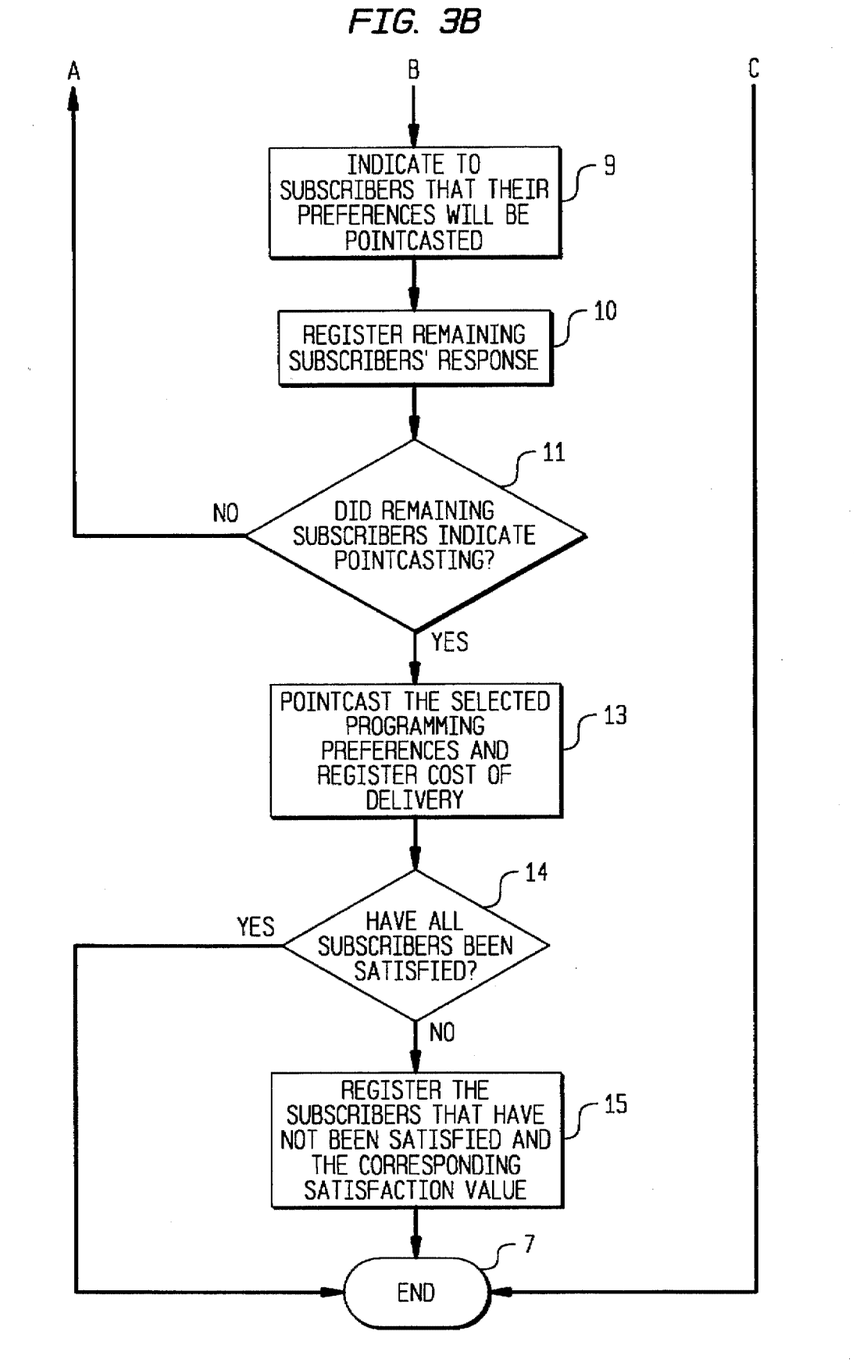

FIGS. 3A and 3B portray a flow chart illustrating the method of operation of the disclosed method and system. A description of FIGS. 3A and 3B is provided hereinbelow with particular emphasis to the circled numerals. In step 1, the service provider registers the selected programming preferences from a plurality of subscriber locations. The preferences may be registered by the subscriber via use of an appropriate interface, such as that described in the UPE patent application. The service provider then checks to determine whether all the programming preferences have been registered (step 2). If they have not been registered, the method goes back to step 1. If registration has been achieved, then in step 4, the service provider (step 3) uses optimization techniques to determine sets of satisfying programs to deliver to the plurality of subscriber locations. In step 5, the service provider in accordance with the present invention determines whether some or all selected programming preferences can be multicasted and satisfy some or all subscriber locations at a minimum cost to the service provider. If yes, then in step 6 some or all selected programming preferences are multicasted and the operation ends (step 7). If no, then in step 8 the service provider determines if there are any remaining programming preferences that were not multicasted. If no, then the operation ends (step 7). If yes, then in step 9 the service provider indicates to the appropriate subscribers that it cannot deliver by multicasting their selected programming preferences, due to insufficient equipment, and that delivery by pointcasting will cost extra. In step 10, the service provider accepts the response from the subscribers whose preferences were not multicasted. In step 11, the service provider determines whether the subscribers desire their preferred programs to be pointcasted at an additional charge. If no, then in step 12 the service provider accepts new programming preferences and the method goes back to step 4. If yes, then the original selected programming preferences are pointcasted and the additional charges are recorded under the subscriber's account (step 13). In step 14, the service provider determines whether all subscribers have been satisfied. If no, then in step 15, the service provider registers which subscribers have not been satisfied and the corresponding satisfaction values. If yes, the method of operation ends.

Additional features can be achieved with the disclosed method and system. For example, the service provider could solicit feedback from subscribers to gauge their level of satisfaction, and from this feedback tune the optimization method, another form of interactive communications between the service provider and the subscriber locations. Further, each subscriber could have several distinct preferences, each one named (e.g., "drama," "lite" etc.), changeable at any time through a UPE-type interface, as disclosed in the commonly assigned UPE patent application.

In addition, the service provided by the present invention could be priced in different ways. One would allow the subscriber some maximum number of times a month that the subscriber's preferences could be used. Another would charge a small service fee for maintaining the preferences, then levy an additional charge each time the preferences are used. Preference profile components could be priced differently. For example, a subscriber might pay more for more individual control: specific movie, specific time constraints, VCR-control, etc., because the service provider would more likely have to pointcast the programming preferences.

Figure 4:
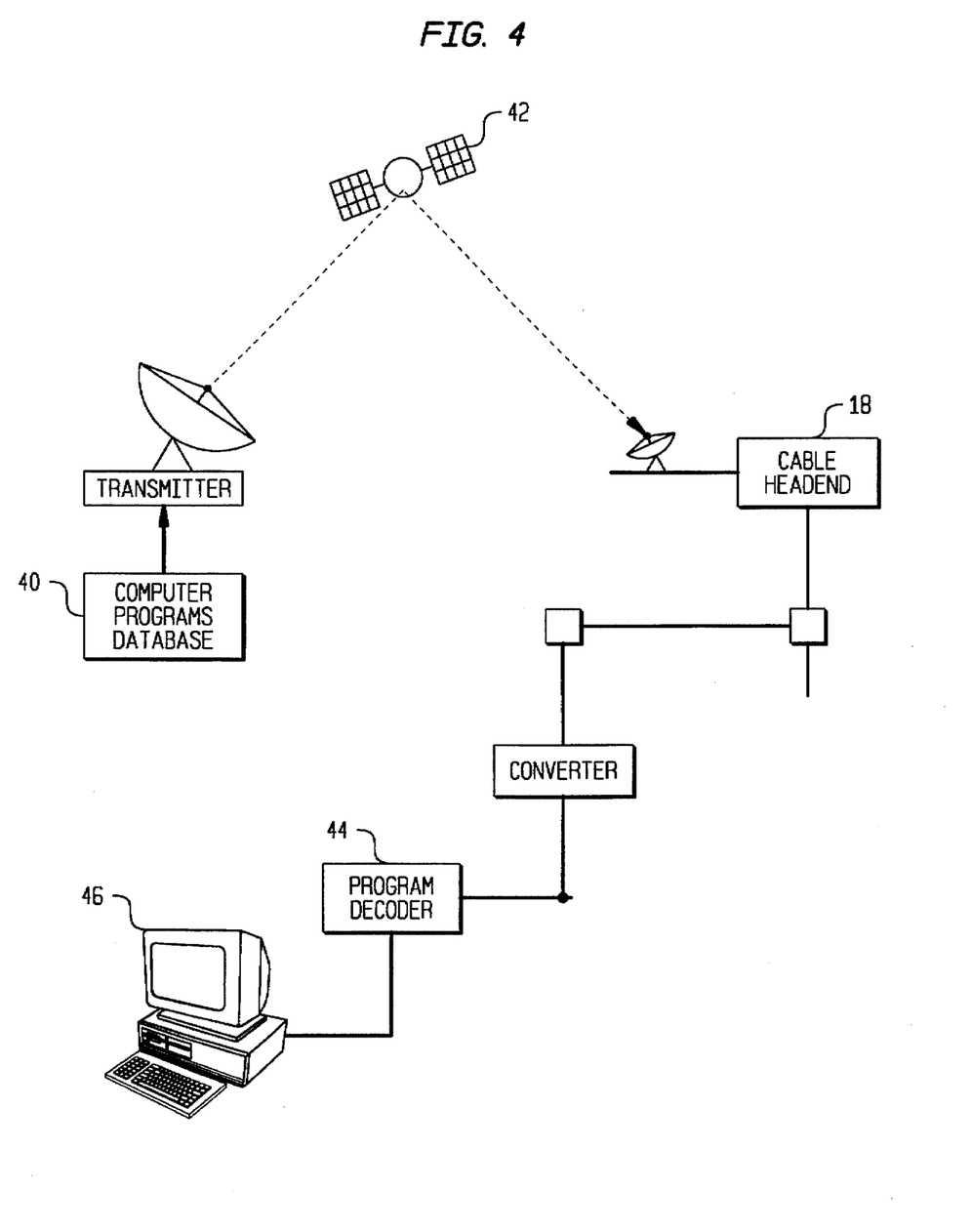
FIG. 4 is a block diagram of software distribution via satellite and cable in accordance with the present invention.

It will be understood that each of the elements described above, or two or more together, may also find a useful application in other types of constructions differing from the type described above. For example, with reference to FIG. 4, the present invention method and system can be implemented to deliver selected computer programs or software to microcomputers at subscriber locations. A database 40 containing a plurality of computer programs and located at a remote location from the cable headend 18, transmits via satellite 42 to the headend the programs requested by the subscribers. The headend 18, in accordance with the disclosed method, delivers the requested programs to the appropriate subscriber locations. The programs are received by a program decoder 44 at each subscriber location and routed to a memory storage medium within a microcomputer 46.

While the invention has been illustrated and described as a method and system for providing passive entertainment programming through optimization techniques to multiple subscribers where each subscriber has registered various preferences for the types and timing of programming, such as the preferences described in the commonly assigned UPE patent application, it is not intended to be limited to the details shown, since it will be understood that various omissions, modifications, substitutions and changes in the forms and details of the device illustrated and in its operation can be made by those skilled in the art without departing in any way from the spirit of the present invention.

What is claimed is:

1. A method of providing programs to a plurality of subscriber locations, said method comprising:

receiving a plurality of sets of content requests originating from said subscriber locations, at least some of said sets of content requests including a plurality of programs preferred to be received at the associated subscriber location within a specified time period;

identifying sets of satisfying programs for a given time period from said received content requests, each set of satisfying programs being associated with one of said subscriber locations; and delivering said identified sets of satisfying programs to associated ones of said subscriber locations by multicasting at least some of said satisfying programs within the sets to multiple subscriber locations.

2. A method as in claim 1, wherein said sets of satisfying programs for a given time period are identified by optimization based on said received content requests.

3. A method as in claim 2, wherein optimizing received content requests comprises:

assigning values to a plurality of independent parameters, subject to regional constraints, and where said assignment aims to maximize or minimize dependent parameters.

4. A method as in claim 3, wherein said dependent parameters may include subscriber satisfaction and cost of delivery.

5. A method as in claim 3, wherein said regional constraints may include the types, sequencing, and start- or end-time constraints of a series of programs.

6. A method as in claim 3, wherein said independent parameters may include total downstream bandwidth cost, cost of server resources, and total royalty charges.

7. A system of providing programs having a series of discrete expressive works from a cable headend to a plurality of subscriber locations, said system comprising:

means for receiving a plurality of sets of content requests, each set of content requests originating from one of said subscriber locations and at least some including a plurality of discrete expressive works preferred to be received at the associated subscriber location;

means for determining any selected constraints from said received content requests wherein said selected constraints include type of programming, sequencing, and start- or end-time constraints for each series of discrete expressive works;

means for identifying sets of satisfying programs for a given time period from said received content requests, each set of satisfying programs being associated with one of said subscriber locations; and means for delivering to each subscriber location an associated set of satisfying programs by multicasting at least some of said satisfying programs within the sets to multiple subscriber locations.

8. A system as in claim 7, wherein said means for identifying sets of satisfying programs for a given time period identifies optimum sets of satisfying programs based on said received content requests.

9. A method as in claim 1, wherein said identifying sets of satisfying programs includes providing substitute programs for programs specified in said received content requests in order to optimize delivery of programs.

10. A system as in claim 7, wherein said means for identifying sets of programs includes means for providing substitute programs for programs specified in said received content requests in order to optimize delivery of programs.

11. A method of providing programs to a plurality of subscriber locations comprising:

receiving program requests from said subscriber locations;

determining optimum satisfying programs to be delivered to associated subscriber locations responsive to said program requests, wherein said satisfying programs are optimized based on a first criterion function that measures closeness of candidate deliverable programs to said program requests, and a second criterion function relating to service provider cost; and delivering said satisfying programs to associated ones of said subscriber locations.

12. The method according to claim 11, wherein said second criterion function is based on total downstream bandwidth cost, server resources and total royalty charges for said candidate deliverable programs.

13. The method according to claim 11, wherein said receiving program requests includes receiving program types.

14. The method according to claim 11, wherein said receiving program requests includes receiving a plurality of program requests for a given time period from any one of said subscriber locations.

* * * * *